(12) United States Patent
Fujiyama

(10) Patent No.: US 6,782,957 B2
(45) Date of Patent: Aug. 31, 2004

(54) AIR IMPACT DRIVER

(75) Inventor: Takeo Fujiyama, Tokyo (JP)

(73) Assignee: Max Co., Ltd., Tokyo (JP)

( * ) Notice: Subject to any disclaimer, the term of this patent is extended or adjusted under 35 U.S.C. 154(b) by 53 days.

(21) Appl. No.: 09/978,051

(22) Filed: Oct. 17, 2001

(65) Prior Publication Data

US 2002/0043386 A1 Apr. 18, 2002

(30) Foreign Application Priority Data

| Oct. 18, 2000 | (JP) | 2000-318372 |
| Oct. 18, 2000 | (JP) | 2000-318374 |
| Oct. 18, 2000 | (JP) | 2000-318377 |
| Oct. 18, 2000 | (JP) | 2000-318392 |

(51) Int. Cl.[7] .......................................... B25D 15/00
(52) U.S. Cl. ........................ 173/93.5; 173/176; 173/109
(58) Field of Search .............................. 227/136; 173/4, 173/11, 176, 178, 206, 109, 93.5, 104; 81/473, 474, 475, 476

(56) References Cited

U.S. PATENT DOCUMENTS

| 2,341,497 | A | * | 2/1944 | Amtsberg | 173/93.5 |
| 3,498,389 | A | * | 3/1970 | Tibbott | 173/178 |
| 3,596,542 | A | * | 8/1971 | Wallace | 81/474 |
| 4,650,007 | A | * | 3/1987 | Fujita et al. | 173/178 |
| 4,729,260 | A | * | 3/1988 | Dudden | 475/125 |
| 4,875,528 | A | * | 10/1989 | Thackston | 173/178 |
| 5,231,902 | A | * | 8/1993 | Uno et al. | 81/57.44 |
| 5,505,676 | A | * | 4/1996 | Bookshar | 477/178 |
| 5,730,035 | A | * | 3/1998 | Ohmori et al. | 81/57.44 |
| 5,778,989 | A | * | 7/1998 | Neumaier | 173/178 |
| 5,862,724 | A | * | 1/1999 | Arata et al. | 81/434 |
| 5,865,076 | A | * | 2/1999 | Fujiyama et al. | 81/474 |
| 5,947,210 | A | * | 9/1999 | Sasaki et al. | 173/178 |
| 6,026,713 | A | * | 2/2000 | Ohmori et al. | 81/57.44 |
| 6,247,387 | B1 | * | 6/2001 | Ketteringham | 81/467 |

* cited by examiner

Primary Examiner—Scott A. Smith
Assistant Examiner—Paul Durand
(74) Attorney, Agent, or Firm—Morgan, Lewis & Bockius LLP

(57) ABSTRACT

An air cylinder is connected to a centrifugal mesh clutch mechanism connected to an air motor. A driver bit is mounted to a front face of a piston of the air cylinder. A hexagonal shaft is mounted to a rear face thereof and the hexagonal shaft is fitted to a hexagonal hole formed at an anvil of the centrifugal mesh clutch mechanism. A hole having a diameter larger than that of the hexagonal shaft is formed at center of a rotor of the air motor to thereby enable to freely lift the piston and the driver bit in the air cylinder. By simultaneously driving the air motor and the air cylinder by pressurized air, the hexagonal shaft, the piston and the driver bit advance while rotating integrally to thereby fasten a screw.

7 Claims, 16 Drawing Sheets

AIR IMPACT DRIVER

BACKGROUND OF THE INVENTION

1. Field of the Invention

The present invention relates to an air impact driver, particularly to an air impact driver using sheet-connected screws, which a number of screws are connected in parallel.

2. Description of the Related Art

With regard to an air impact driver with compressed air as a power source, there is known an air impact driver using sheet-connected screws, which a number of screws are connected in parallel. According to an air impact driver of this kind, a slide nose is mounted to a front end portion of a main body mounted with a driver bit driven to is rotate by an air motor and the slide nose is attached with a screw feed guide and a screw feed mechanism.

The slide nose is projected forward from the main body by a compression spring and is provided with a slide stroke equal to or longer than a length of a screw. When a front end of the slide nose is pressed against the surface of a plate member or the like and the air impact driver is triggered, the driver bit rotates a screw in the slide nose, the screw is fastened by pressing the air impact driver against the plate member, the slide nose is slid by being pressed to a side of the main body of the air impact driver and the main body gets proximate to the surface of the plate member. After finishing to fasten the screw, when the air impact driver is pulled up, the slide nose returns to an initial position and a successive screw is fed into the slide nose by the screw feed mechanism.

Further, there has already been known a screw fastener for transmitting rotational torque of an air motor to a driver bit via a reduction gear and moving the driver bit in a screw fastening direction by a piston mechanism.

According to the conventional air impact driver for connecting screws, the front end portion of the main body is provided with the slide nose having the long slide stroke and in screw fastening operation, the main body of the air impact driver must be pushed to move in the direction of a screw fastening object against spring force of the compression spring mounted to the slide nose. Therefore, it is laborious.

Further, according to the mechanism for transmitting the rotational torque of the air motor to the driver bit via the reduction gear and moving the driver bit in the screw fastening direction by the piston mechanism, rotational torque of the reduction gear is continuously transmitted to the driver bit via a spline mechanism and therefore, sliding resistance at the spline mechanism portion is increased, a large piston diameter is needed for sufficiently sliding to move the driver bit and there poses a problem that large-sized tool results and repulsive force against the tool is increased.

Still further, according to the conventional air impact driver for connected screws, there is constructed a constitution in which the slide nose having the long slide stroke is provided at the front end portion of the main body and the screw is fastened by pressing the slide nose to the screw fastening object and therefore, there poses a problem that a total length of the air impact driver is long and the air impact driver is large-sized and difficult to handle.

SUMMARY OF THE INVENTION

Accordingly, there poses a technical problem to be resolved for alleviating laboriousness of screw fastening operation and it is a first object of the invention to resolve this problem.

Further, there poses another technical problem to be resolved in order to provide an air impact driver which is further small-sized and having excellent operability and it is a second object of the invention to resolve this problem.

A first aspect of the invention is proposed in order to achieve the above-described objects and provides an air impact driver for driving to rotate a driver bit by transmitting a rotational torque of an air motor to the driver bit via a centrifugal mesh clutch mechanism. The centrifugal mesh clutch mechanism, an air cylinder, and a fixed nose constituting a screw guide are arranged in one row on a same axis line. The driver bit is mounted to a front face of a piston of the air cylinder, and a spline shaft is mounted to a rear face thereof. A shaft hole slidingly paired with the spline shaft is provided at a center of a driven rotational member intermittently rotated by the centrifugal mesh clutch mechanism and fitted with the spline shaft. The spline shaft, the piston, and the driver bit advance while being rotated integrally by driving the air motor and the air cylinder to thereby fasten a screw.

A second aspect of the invention is proposed in order to achieve the above-described objects and provides an air impact driver for driving to rotate a driver bit by transmitting a rotational torque of an air motor to the driver bit via a centrifugal mesh clutch mechanism. An air motor, the centrifugal mesh clutch mechanism, an air cylinder and a fixed nose constituting a screw guide are arranged in one row on a same axis line. A driver bit is mounted to a front face of a piston of the air cylinder, and a spline shaft is mounted to a rear face thereof. A shaft hole slidingly paired with the spline shaft is provided at a center of a driven rotational member of the centrifugal mesh clutch mechanism. A hole having a diameter larger than a diameter of the spline shaft is provided at a center of a rotor of the air motor. The spline shaft of the air cylinder penetrates a shaft hole of the driven rotating member and is formed to be capable of advancing into the center hole of the rotor. The piston and the driver bit advance while rotating integrally to thereby fasten a screw by driving the air motor and the air cylinder.

A third aspect of the invention is proposed in order to achieve the above-described objects and provides an air impact driver for driving to rotate a driver bit by transmitting a rotational torque of an air motor to the driver bit via a centrifugal mesh clutch mechanism. The centrifugal mesh clutch mechanism, an air cylinder, and a fixed nose constituting a screw guide are arranged in one row on a same axis line. A driver bit is mounted to a front face of a piston of the air cylinder, and a spline shaft is mounted to a rear face thereof. A shaft hole slidingly paired with the spline shaft is provided at a center of a driven rotational member of the centrifugal mesh clutch mechanism and fitted with the spline shaft. The spline shaft, the piston, and the driver bit advance while integrally rotating to thereby fasten a screw by driving the air motor and the air cylinder. Further, a delaying circuit is inserted to an air motor control circuit to thereby delay a start timing of the air motor relative to a start timing of the air cylinder, and rotation is started after the driver bit is lowered and brought into contact with a screw head.

A fourth aspect of the invention is proposed in order to achieve the above-described objects and provides an air impact driver including an air motor, a centrifugal mesh clutch mechanism, and a double action air cylinder. A driver bit is mounted to a front face of a piston of the double action cylinder, a spline shaft is mounted to a rear face thereof. The spline shaft and a driven rotational member of the centrifugal mesh clutch mechanism are fitted to each other by a spline. A pneumatic circuit for supplying pressurized air to a retracting side air chamber of the double action air cylinder via a trigger valve at an off position of the trigger valve and for supplying the pressurized air to the air motor and an extracting side air chamber of the double action air cylinder via the trigger valve at an on position of the trigger valve. The piston, the spline shaft, and the driver bit advance while rotating integrally by making the trigger valve on, and the piston, the spline shaft, and the driver bit are retracted and returned to initial positions by making the trigger valve off.

BRIEF DESCRIPTION OF THE DRAWINGS

FIG. 1b and FIG. 1c are detail cross-sections views of FIG. 1a.

FIG. 2b and FIG. 2c are detail cross-sections of FIG. 2a.

FIG. 3a is a sectional view of the air impact driver showing a procedure successive to FIG. 2a.

FIG. 3b and FIG. 3c are detail cross-sections of FIG. 3a.

FIG. 4b and FIG. 4c are detail cross-sections of FIG. 4a.

FIG. 6b and FIG. 6c are detail cross-sections of FIG. 6a.

FIG. 9b and FIG. 9c are detail cross-sections of FIG. 9a.

FIG. 10b and FIG. 10c are detail cross-sections of FIG. 10a.

DETAILED DESCRIPTION OF THE PREFERRED EMBODIMENTS

Figure 1A:
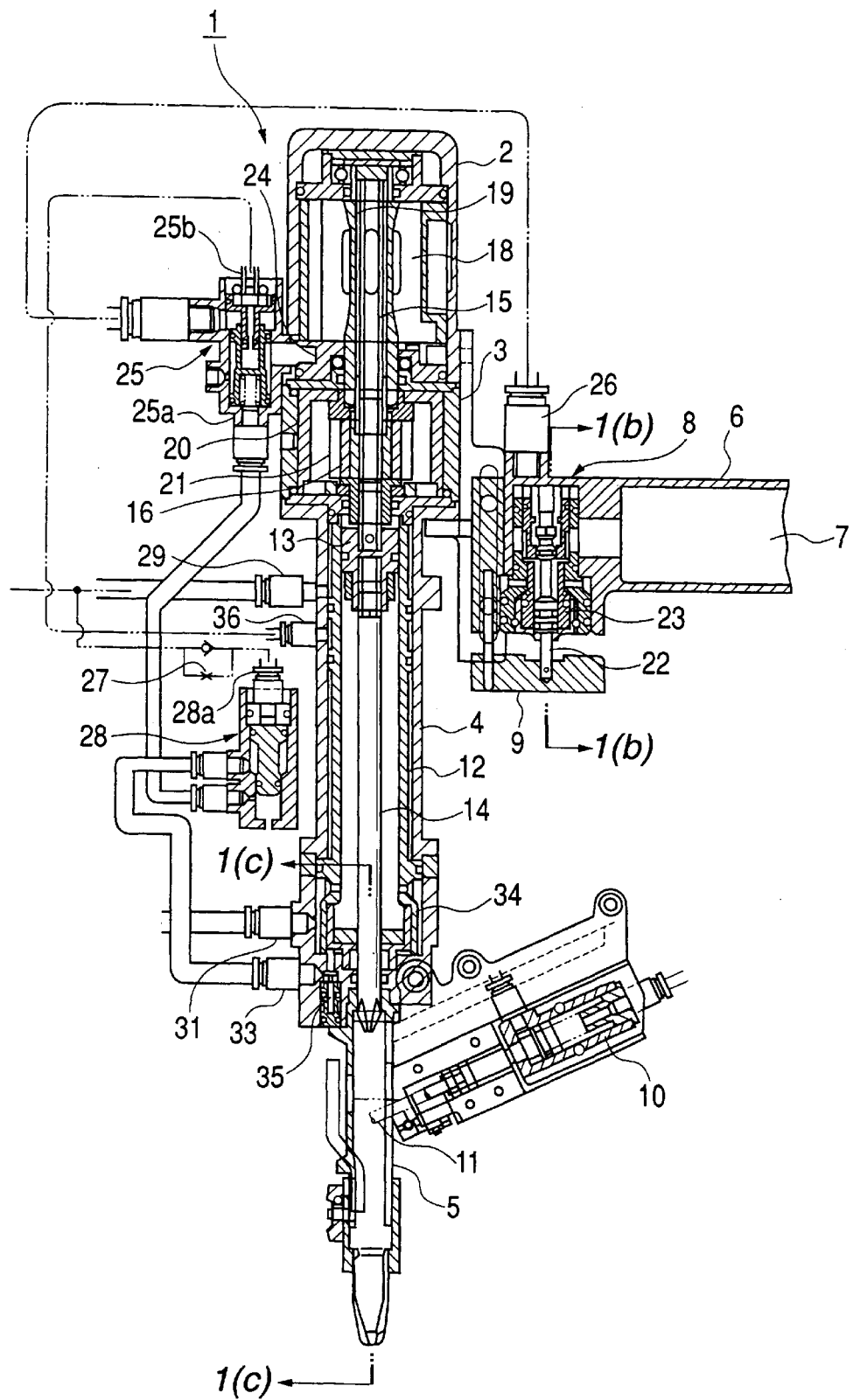
FIG. 1a is a sectional view showing an embodiment of the invention and showing a standby state of an air impact driver.
Figure 1B:
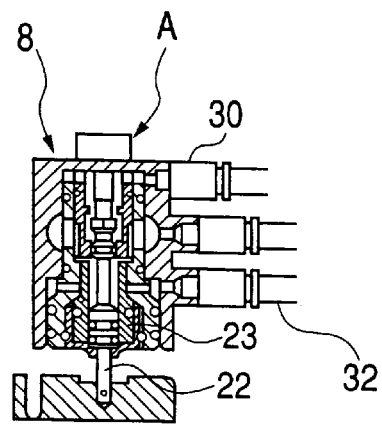

A detailed description will be given of an embodiment of the invention in reference to the drawings as follows. FIG. 1a through FIG. 4c shows an air impact driver 1 and there is constructed a cabinet structure connected with an air motor housing 2, a clutch housing 3, a cylinder housing 4 and a fixed nose 5 in one row from above and attached with a grip 6 extended from the clutch housing 3 in a direction orthogonal thereto.

Although illustration is omitted, an air plug is attached to an end portion of the grip 6 similar to a general pneumatic tool, an air hose is connected to the air plug and high pressure air is supplied from an air compressor to an air chamber 7 in the grip 6.

A trigger valve 8 and a trigger lever 9 are provided at a base portion of the grip 6 and the air impact driver 1 is started and stopped by opening and closing the trigger valve 8 by operating the trigger lever 9 similar to the conventional pneumatic tool.

At a rear face (right side of the drawing) of the fixed nose 5, there is provided a known connected-screws feeding apparatus including a spring offset air cylinder 10 and a feed claw 11 connected to a piston rod thereof and one of connected screws in a connected screws magazine (not illustrated) is fed into the fixed nose 5 by retracting and extracting the feed claw 11 in cooperation with operation of one cycle of the air impact driver 1.

Figure 1C:
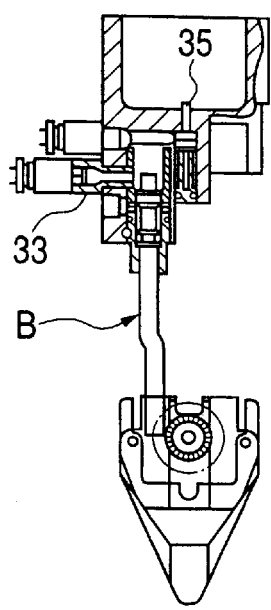
Figure 2A:
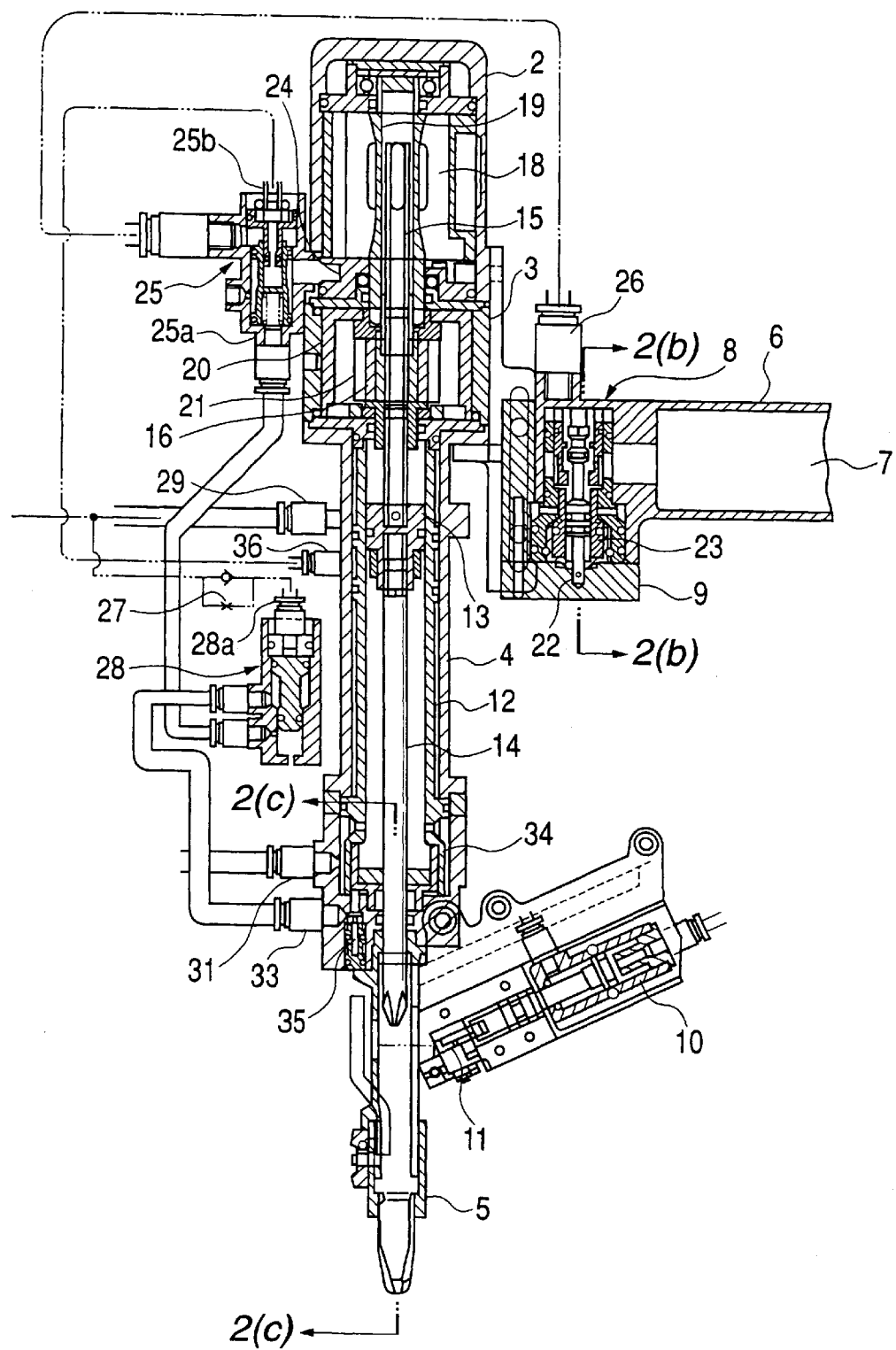
FIG. 2a is a sectional view in starting the air impact driver.
Figure 2B:
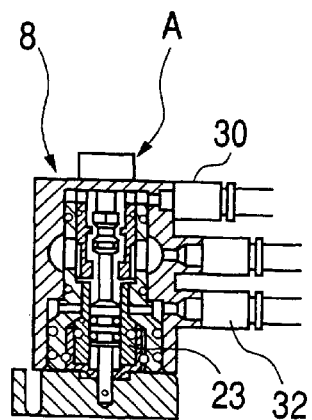
Figure 2C:
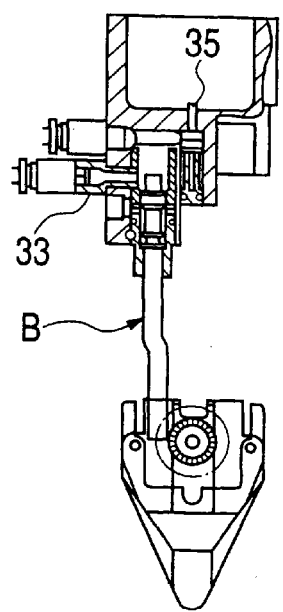
Figure 4A:
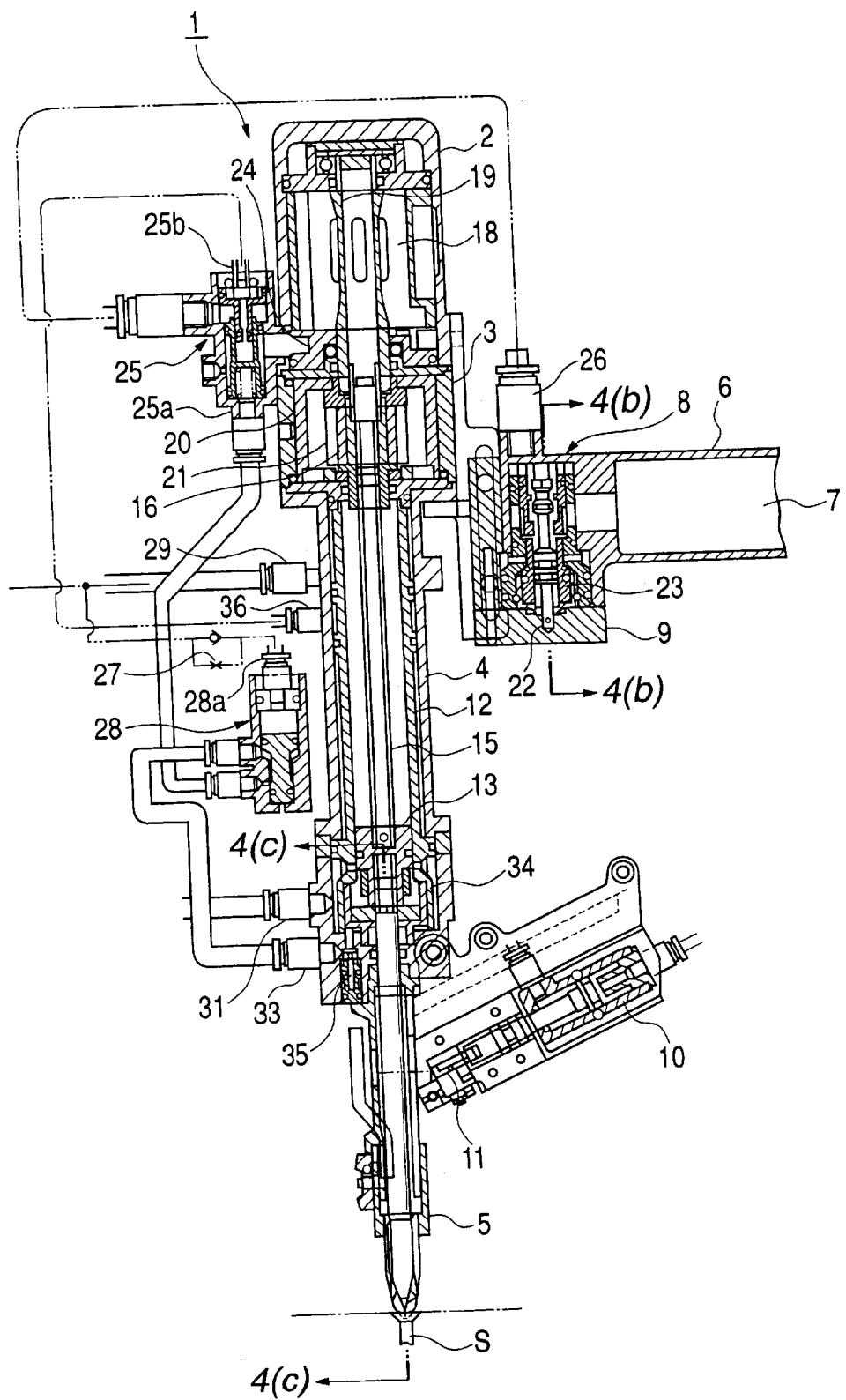
FIG. 4a is a sectional view of the air impact driver when a screw is fastened.
Figure 4B:
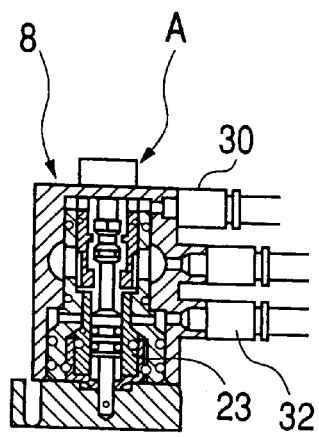
Figure 4C:
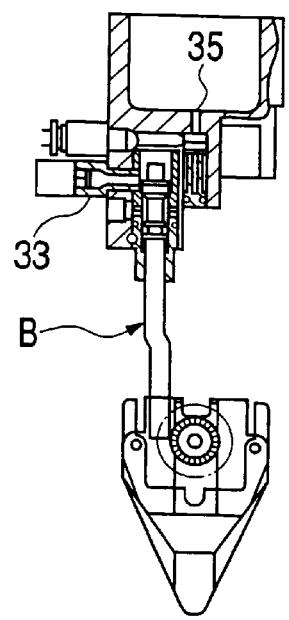

Further, FIGS. 1b, 2b, 3b and 4b on the right upper side of the drawing is a are cross-sectional views of the trigger valve portion from right, FIGS. 1c, 2c, and 4c are cross-sectional views of a portion of a contact nose mounted to the fixed nose 5 from left and air pipes are designated by chain lines.

A piston 13 of an air cylinder 12 included in the cylinder housing 4 is attached with a driver bit 14 at its front face (lower side of the drawing) and attached with a hexagonal shaft 15 at is rear face (upper side of the drawing).

Figure 5:
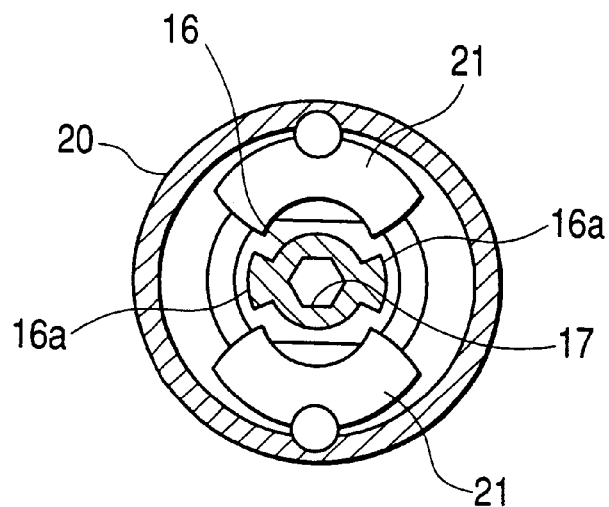
FIG. 5 is a cross-sectional view of a centrifugal mesh clutch mechanism.
Figure 7:
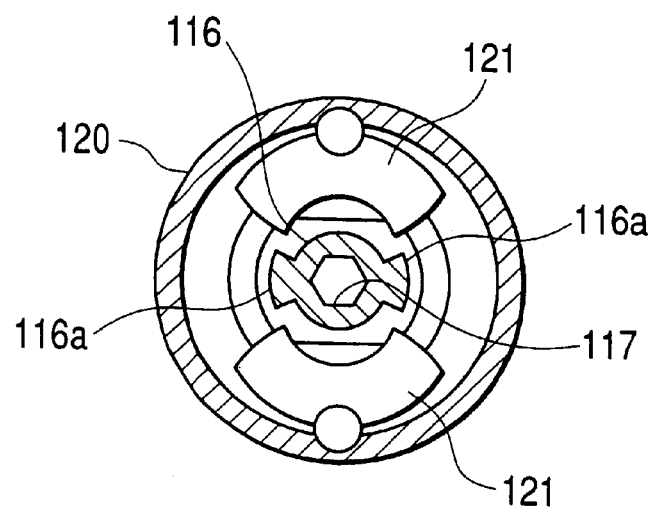
FIG. 7 is a cross-sectional view of a centrifugal mesh clutch mechanism.

As shown by FIG. 5, there is formed a hexagonal hole 17 slidingly paired with the hexagonal shaft 15 at a driven rotational member 16 (hereinafter, referred to as anvil) arranged at a center of a centrifugal mesh clutch mechanism and the hexagonal shaft 15 is inserted into the hexagonal hole 17. As shown by FIG. 1 a rotor 18 of the air motor is provided with a center hole 19 having a diameter larger than that of the hexagonal shaft 15 and an upper portion of the hexagonal shaft 15 penetrates the hexagonal hole 17 and advances into the center hole 19 of the rotor 18. The piston 13, the driver bit 14 and the hexagonal shaft 15 are rotated axially along with the anvil 16 of the centrifugal mesh clutch mechanism and are liftable at inside of the air cylinder.

Impact operation by the air motor and the centrifugal mesh clutch mechanism is well known and the rotor 18 of the air motor and an outer rotor 20 of the centrifugal mesh clutch mechanism are rotated integrally with each other. As shown by FIG. 5, the outer rotor 20 is attached with pivoting type clutch claws 21. In starting the outer rotor 20, a claw on a front side of the clutch claw 21 in a rotational direction, is turned in a direction of a rotational center by stationary inertia and is impacted to a projected portion 16a of the anvil 16 having a section in a shape of a butterfly and strikes the anvil 16 in the rotational direction. Further, by reaction of the strike, rotational speed of the outer rotor 20 is reduced and the claw on the front side of the clutch claw 21 in the rotational direction is moved in an outer peripheral direction by motional inertia reverse to the direction in starting and is disengaged from the projected portion 16a of the anvil 16. Thereby, the rotational speed of the outer rotor 20 is immediately increased and therefore, the clutch claw 21 is engaged with and strikes the anvil 16 again as in starting. In this way, the engaging and disengaging motion is repeated at high speed and the anvil is continuously struck in the rotational direction to thereby rotate the hexagonal shaft 15, the piston 13 and the driver bit 14.

Next, an explanation will be given of operational strokes of the air impact driver 1 and a pneumatic pressure circuit related thereto. FIG. 1a and 1c shows a standby state, a stem 22 of the trigger valve 8 is lowered to a closed position and a poppet 23 coaxial with the stem 22 is lifted by a spring and pneumatic pressure operated to a lower face thereof.

An intake port 24 of the air motor is connected to an upper port 26 of the trigger valve 8 via a changeover valve 25 and a throttle 27 constituting a delaying circuit and a pilot valve 28 are connected to a lower pilot port 25a of the changeover valve 25.

An upper port 29 of the air cylinder 12 is connected to an upper port of the trigger valve 8 shown in portion A and a lower port 31 of the air cylinder 12 is connected to a lower port 32 of the trigger valve 8.

When the trigger valve 8 is disposed at the closed position, high pressure air in the air chamber 7 is supplied from the lower port 32 of the trigger valve 8 to a lower air chamber of the air cylinder 12 and pushes up the piston 13 to an upper standby position.

FIG. 2a shows a state immediately after starting by pulling the trigger lever 9, by lifting the stem 22 of the trigger valve 8, the poppet 23 is lowered by exhausting pressurized air operated to the lower face of the poppet 23 to the atmosphere, air in the lower air chamber of the air cylinder 12 is exhausted to the atmosphere via the trigger valve 8. The upper ports 26 and 30 of the trigger valve 8 and the air chamber 7 are communicated with each other. Thereby, pressurized air is supplied to an upper air chamber of the air cylinder 12 via the upper port 30 of the trigger valve 8 and the piston 13 starts lowering. Further, although pressurized air is supplied to an upper control port 28a of the pilot valve 28 via the throttle 27, at this time, the pilot valve 28 maintains a closed position by speed reducing operation of the throttle 27 and the changeover valve 25 of the air motor remains closed.

Figure 3A:
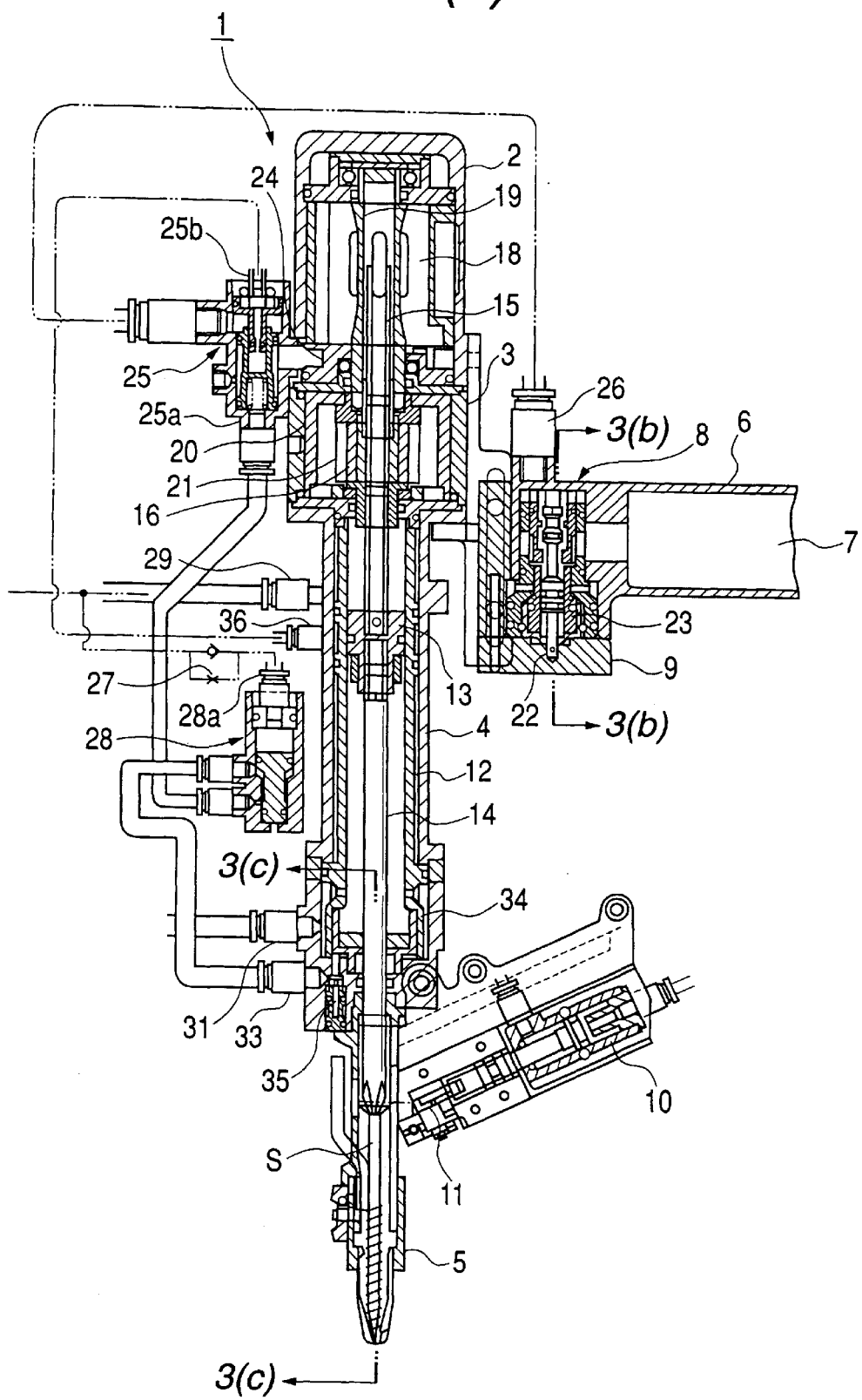
Figure 3B:
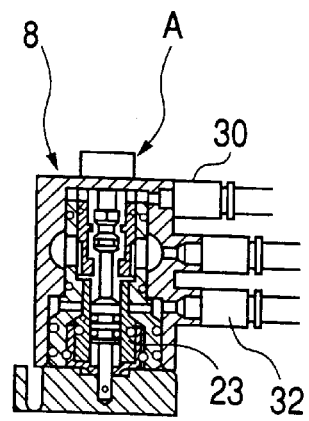
Figure 3C:
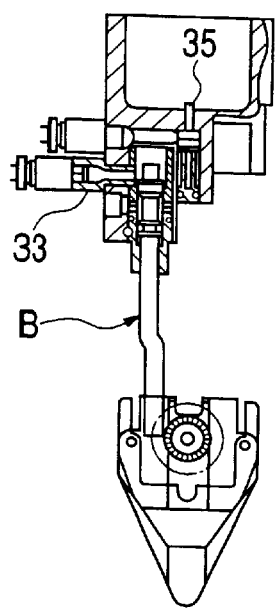

FIG. 3a shows a state in which the piston 13 is further lowered and a front end of the driver bit 14 is fitted to a recess of a screw S, substantially at this time, air pressure downstream from the throttle 27 is increased and a spool of the pilot valve 28 is lowered and pressurized air is supplied from a relay port 33 at a lower end portion of a cylinder housing 34 to the lower pilot port 25a of the changeover valve 25 via the pilot valve 28. Thereby, the spool of the changeover valve 25 is lifted, pressurized air of the air chamber 7 is supplied into the air motor housing 2 and the rotor 18 is started.

When the delaying circuit such as the throttle 27 is not provided, the air cylinder and the air motor are started simultaneously, the driver bit 14 rotated at high speed is impacted to the head of the screw S, the recess of the screw is destructed and the screw cannot be fastened, however, the driver bit 24 is lowered in an unrotated state by the delaying circuit and is fitted to the recess of the screw and therefore, destruction of the screw can be prevented.

When the rotor 18 is started, as mentioned above, the hexagonal shaft 15 fitted to the anvil 16 of the centrifugal mesh clutch mechanism, the piston 13 and the driver bit 14 are integrally rotated and microscopically, there are continuously repeated intermittent rotation and lowering operation in a state in which the clutch is disengaged and rotational torque is not applied to thereby fasten and the screw is screwed to a screw fastening object.

FIG. 4a shows a state in which the piston 13 reaches a lower end of a movable range, a poppet valve 35 at a bottom of the cylinder housing 4 is opened by being pushed by a movable bumper 34 at inside of the air cylinder 12. Accordingly, pneumatic pressure operated to the lower pilot port 25a of the changeover valve 25 via the pilot valve 28 is lowered, and the spool is lowered by pneumatic pressure supplied from an upper vent port 36 of the air cylinder 12 to an upper pilot port 25b of the changeover valve 25 to thereby close the changeover valve 25 and stop the rotor 18.

After fastening the screw, when the trigger lever 9 is made OFF, the stem 22 of the trigger valve 8 is lowered to the initial position, the poppet 23 is lifted, pressurized air is supplied from the air chamber 7 to the lower air chamber of the air cylinder 12, and the piston 13 is lifted and returns to the initial position.

Figure 6A:
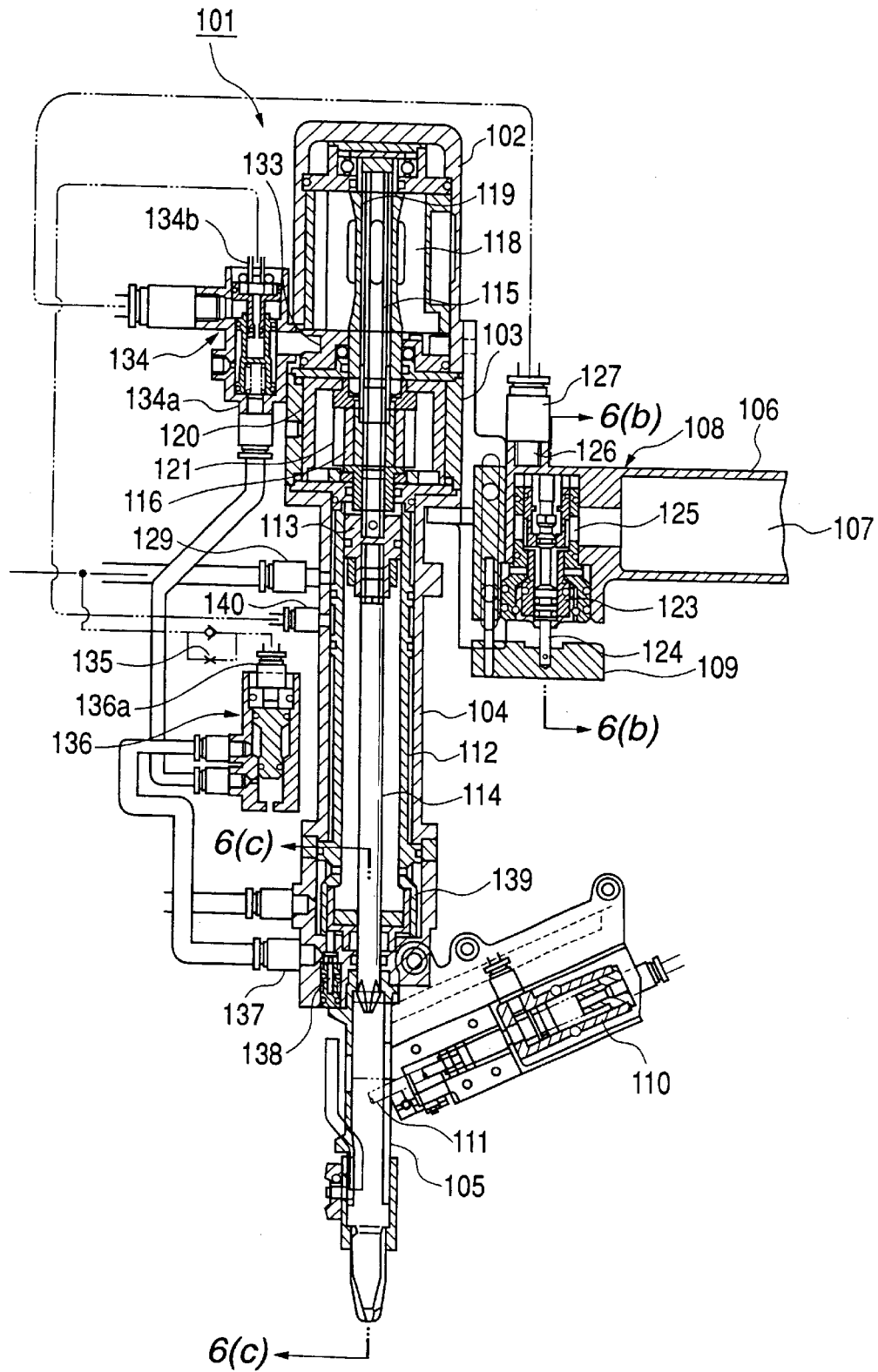
FIG. 6a is a sectional view showing an embodiment of the invention and showing a standby state of an air impact driver.

A detailed description will be given of another embodiment of the invention in reference to the drawings of FIGS. 6a to 10c. FIG. 6a shows an air impact driver 101 and there is constructed a cabinet structure connected with an air motor housing 102, a clutch housing 103, a cylinder housing 104 and a fixed nose 105 in one row from above and attached with a grip 106 extended from the clutch housing 103 in a direction orthogonal thereto.

Although illustration is omitted, an air plug is attached to an end portion of the grip 106 similar to a general pneumatic tool, an air hose is connected to the air plug and high pressure air is supplied from an air compressor to an air chamber 107 in the grip 106.

A trigger valve 108 and a trigger lever 109 are provided at a base portion of the grip 106 and the air impact driver 101 is started and stopped by opening and closing the trigger valve 108 by operating the trigger lever 109 similar to the conventional pneumatic tool.

At a rear face (right side of the drawing) of the fixed nose 105, there is provided a known connected-screws feeding apparatus including a spring offset air cylinder 110 and a feed claw 111 connected to a piston rod thereof and one of connected screws in a connected screws magazine (not illustrated) is fed into the fixed nose 105 by retracting and extracting the feed claw 111 in cooperation with operation of one cycle of the air impact driver 101.

Figure 6B:
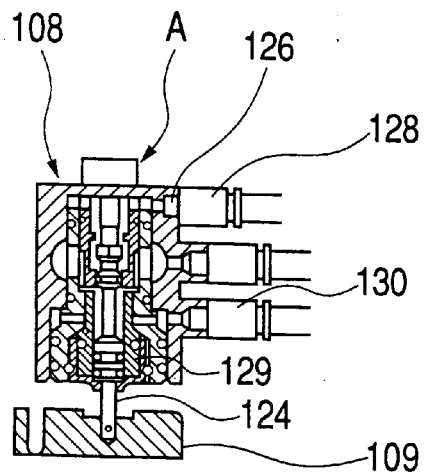
Figure 6C:
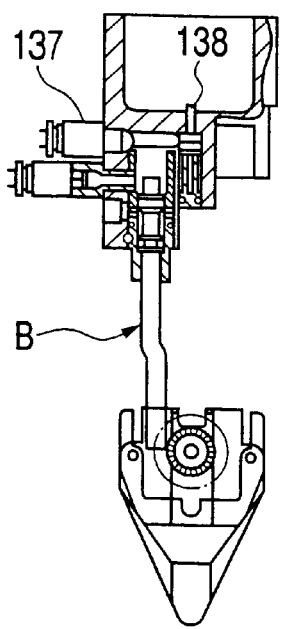

Further, FIG. 6b is a sectional view of the trigger valve portion from right, FIG. 6c is a sectional view of a portion of a contact nose mounted to the fixed nose 105 from left and air pipes are designated by chain lines.

A piston 113 of a double action air cylinder 112 included in the cylinder housing 104 is attached with a driver bit 114 at its front face (lower side of the drawing) and attached with a hexagonal shaft 115 at is rear face (upper side of the drawing).

In the clutch housing 103, there is formed a hexagonal hole 117 slidingly paired with the hexagonal shaft 115 at a driven rotational member 116 (hereinafter, referred to as anvil) arranged at a center of a centrifugal mesh clutch mechanism and the hexagonal shaft 115 is inserted into the hexagonal hole 117.

A rotor 118 of the air motor is provided with a center hole 119 having a diameter larger than that of the hexagonal shaft 115 and an upper portion of the hexagonal shaft 115 penetrates the hexagonal hole 117 and advances into the center hole 119 of the rotor 118. The piston 113, the driver bit 114 and the hexagonal shaft 115 are rotated axially along with the anvil 116 of the centrifugal mesh clutch mechanism and are liftable at inside of the double action air cylinder.

Impact operation by the air motor and the centrifugal mesh clutch mechanism is well known and the rotor 118 of the air motor and an outer rotor 120 of the centrifugal mesh clutch mechanism are rotated integrally with each other.

As shown by FIG. 7a, the outer rotor 120 is attached with pivoting type clutch claws 121. In starting the outer rotor 120, a claw on a front side of the clutch claw 121 in a rotational direction, is turned in a direction of a rotational center by stationary inertia and is impacted to a projected portion 116a of the anvil 116 having a section in a shape of a butterfly and strikes the anvil 116 in the rotational direction. Further, by reaction of the strike, rotational speed of the outer rotor 120 is reduced and the claw on the front side of the clutch claw 121 in the rotational direction is moved in an outer peripheral direction by motional inertia reverse to the direction in starting and is disengaged from the projected portion 116a of the anvil 116. Thereby, the rotational speed of the outer rotor 120 is immediately increased and therefore, the clutch claw 121 is engaged with and strikes the anvil 116 again as in starting. In this way, the engaging and disengaging motion is repeated at high speed and the anvil is continuously struck in the rotational direction to thereby rotate the hexagonal shaft 115, the piston 113 and the driver bit 114.

A trigger valve 108 shown in FIG. 6*a* is a straight moving type slide valve including a pilot poppet 123 and a stem 124 in a valve body 122. An input port 125 at a middle in the vertical direction communicates with the air chamber 107, an upper port 126 is connected with a pipe 127 to an air motor and a pipe 128 to an extracting side air chamber (upper) of the double action air cylinder 112, and a lower port 129 is connected with a pipe 130 to a retracting side air chamber (lower) of the double action air cylinder 112.

Figures 8A, 8B, 8C:
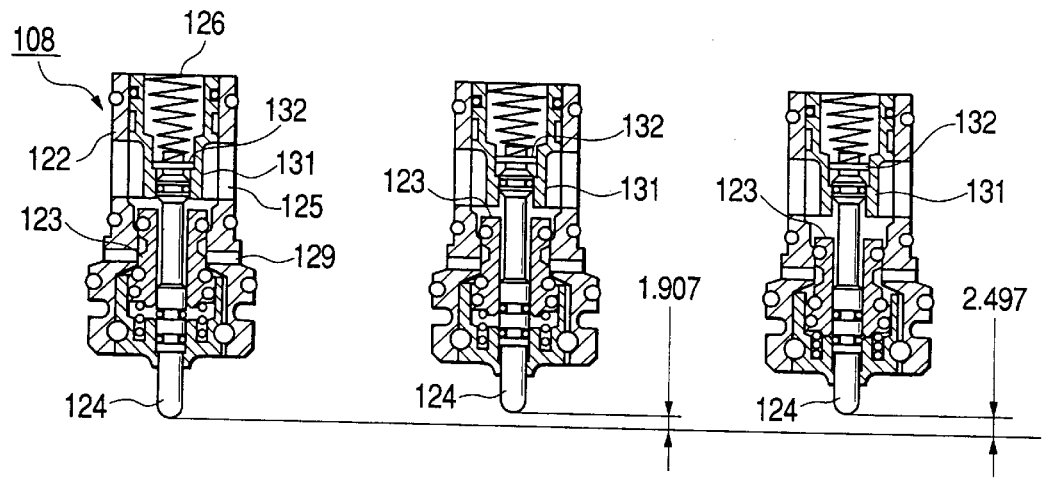
FIGS. 8a, 8b, 8c, 8d, 8e, and 8f are operational strokes of a trigger valve with sectional views.
Figures 8D, 8E, 8F:
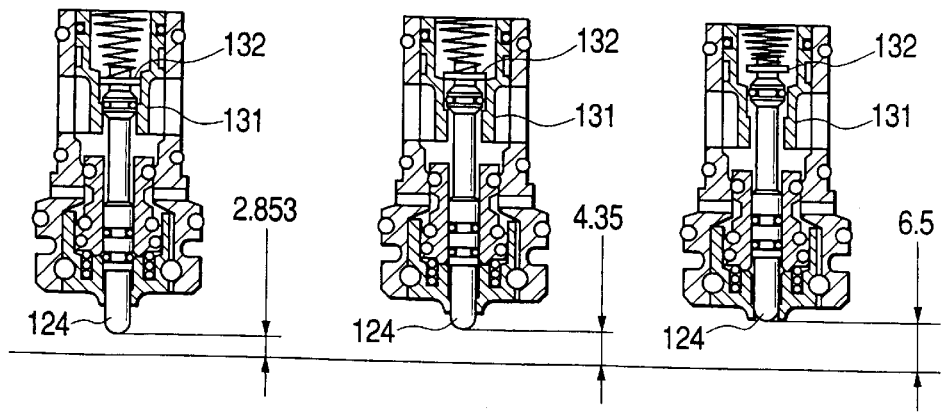

As shown by FIG. 8*a*, there is formed a stepped shape in which an inner diameter of a cylinder portion 131 inserted with an upper portion of the stem 124 is substantially equal to a diameter of an O ring of the stem 124 at its lower portion and the diameter is slightly increased at its upper portion. When the stem 124 is disposed at a lower standby position (a), the input port 125 and the upper portion 126 are blocked from each other.

In an elevating stroke of the stem 124 from (a) to (f), at and after (d), the O ring of the stem 124 advances to the large diameter portion of the cylinder portion 131, and a clearance is produced at a surrounding of the O ring to thereby communicate the input port 125 and the upper port 126. From (d) to (e), there is constituted a throttle position at which a throttle disk 132 at an upper end portion of the stem 124 is disposed in the cylinder portion 131, and at and after (e), a fully opened state is constituted.

At standby position (a), pressurized air is supplied from the air chamber 107 to a lower face of the pilot poppet 123 via a center hole of the pilot poppet 123, the pilot poppet 123 is lifted. Then, the air chamber 107 and the lower port 129 are communicated.

When the stem 124 is pressed by operating the trigger lever 109, as shown by (b), the center hole of the pilot poppet 123 is closed and supply of the pressurized air is stopped to the lower face of the pilot poppet 123. Successively, as shown by (c), pressurized air on the lower face side of the pilot poppet 123 is exhausted via the clearance between the valve body 122 and the stem 124, and the pilot poppet 123 is lowered by a pressure difference operated to two upper and lower faces of the pilot puppet 123. Thereby, the air chamber 107 and the lower port 129 are blocked from each other and pressurized air at the lower port 129 is exhausted to the lower face side of the trigger valve 108 via a vent port.

When the stem 124 is lifted to a position designated by (d), the air chamber 107 and the upper port 126 are communicated with each other. However, since the throttle disk 132 of the upper end portion of the stem 124 is disposed in the cylinder portion 131, a flow rate of air supplied to the upper port 126 is throttled and pressure loss is caused. Further, when the valve stem 124 passes through a position designated by (e), the throttle disk 132 comes out from the cylinder portion 131, the pressure loss is almost eliminated and high pressure air is supplied to the upper port 126

Next, an explanation will be given of operational strokes of the air impact driver 101. FIG. 6*a* shows a standby state, a stem 122 of the trigger valve 108 is lowered to a closed position, and a poppet 123 is lifted by a spring and pneumatic pressure operated to a lower face thereof.

An intake port 133 of the air motor is connected to a changeover valve 134, and a throttle 135 constituting a delaying circuit and a pilot valve 136 are connected to a lower pilot port 34*a* of the changeover valve 34.

When the trigger valve 108 is disposed at the closed position, high pressure air in the air chamber 107 is supplied from the lower port 132 of the trigger valve 108 to a retracting side air chamber of the double action air cylinder 112 and pushes up the piston 113 to an upper standby position.

Immediately after pulling the trigger lever 109, the pilot poppet 123 is lowered, air in the retracting side air chamber of the double action air cylinder 112 is exhausted to the atmosphere via the trigger valve 108 and the upper port 126 of the trigger valve 108 and the air chamber 107 are communicated. As mentioned above, a path sectional area of the trigger valve 108 can be controlled by an operating amount of the trigger lever 109. Further, when an initial stage of the valve stroke (FIG. 8*d*) is maintained, the flow rate of air supplied to the upper port 126 is throttled and pressurized air under comparatively low pressure is supplied to the double action air cylinder 112 and the piston 113 starts lowering at low speed.

Further, although pressurized air is supplied to an upper control port 136*a* of the pilot valve 136 via the throttle 135, the pivot valve 136 maintains a closed position during a certain time period after starting the double action air cylinder 112 by speed reducing operation of the throttle 135 to thereby close the changeover valve 134 of the air motor.

Figure 9A:
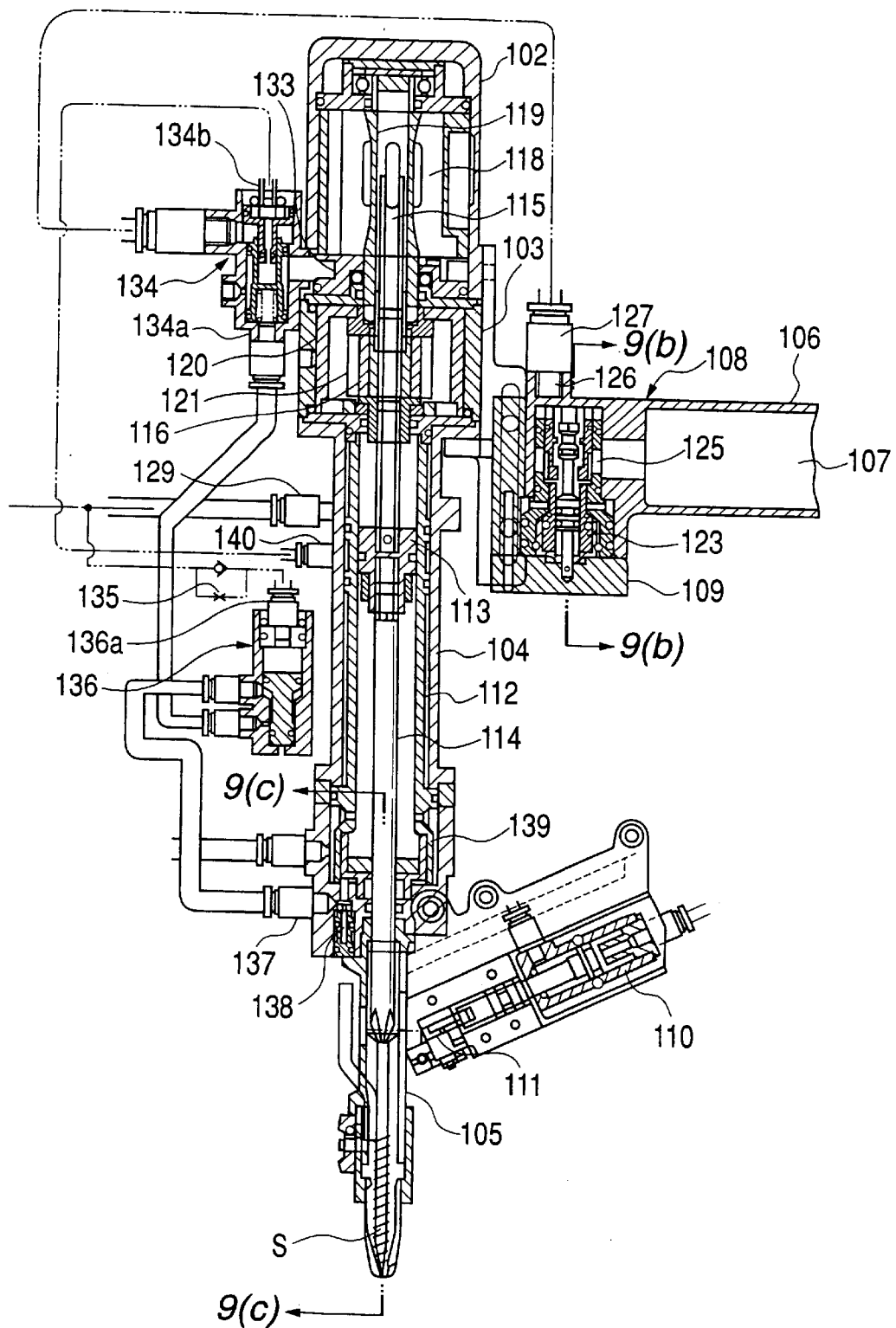
FIG. 9a is a sectional view when the air impact driver is operated.
Figure 9B:
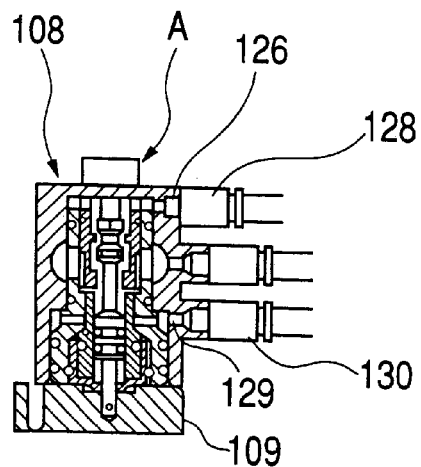
Figure 9C:
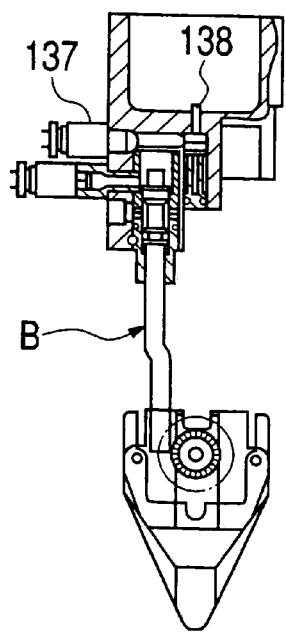

Further, when pneumatic pressure downstream from the throttle 135 is increased after the certain time period, as shown by FIG. 9*a*, a spool of the pilot valve 136 is lowered, and pressurized air is supplied from a relay port 137 at a lower end portion of the cylinder housing 104 to the lower pilot port 134*a* of the changeover valve 134 via the pilot valve 136. Thereby, the spool of the changeover valve 134 is lifted, pressurized air of the air chamber 107 is supplied into the air motor housing 102 to thereby start the rotor 118 and rotate the driver bit 114.

In this way, speed of operating the air cylinder and the air motor can be controlled by the operating amount of the trigger lever 109. Accordingly, a recess of a screw can be prevented from being destructed thereby along with operation of delaying to start the air motor by the throttle 135.

When the rotor 118 is started, as mentioned above, the hexagonal shaft 115 fitted to the anvil 116 of the centrifugal mesh clutch mechanism and the piston 113 and the driver bit 114 are integrally rotated, microscopically, there are continuously repeated intermittent rotation and lowering operation in a state in which the clutch is disengaged and rotational torque is not applied. Then, the screw is fastened to a screw fastening object.

Here, it is important that balance between extracting force of the air cylinder and the rotational torque of the air motor is constant. When the extracting force of the air cylinder is lowered in comparison with the rotational torque of the air motor, force for pressing the driver bit to the screw is relatively lowered, thereby, there is caused a come-out phenomenon in which the front end of the driver bit is disengaged from the recess of the screw.

According to the air impact driver of the invention, different from a constitution in which the air motor and the air cylinder are controlled by individual pilot valves, pressurized air is supplied to the air cylinder and the air motor from the single trigger valve 108. Accordingly, regardless of the air chamber pressure or the operating amount of the trigger valve, the balance between pressures supplied to the air cylinder and the air motor is maintained constant and the come-out is not caused.

Figure 10A:
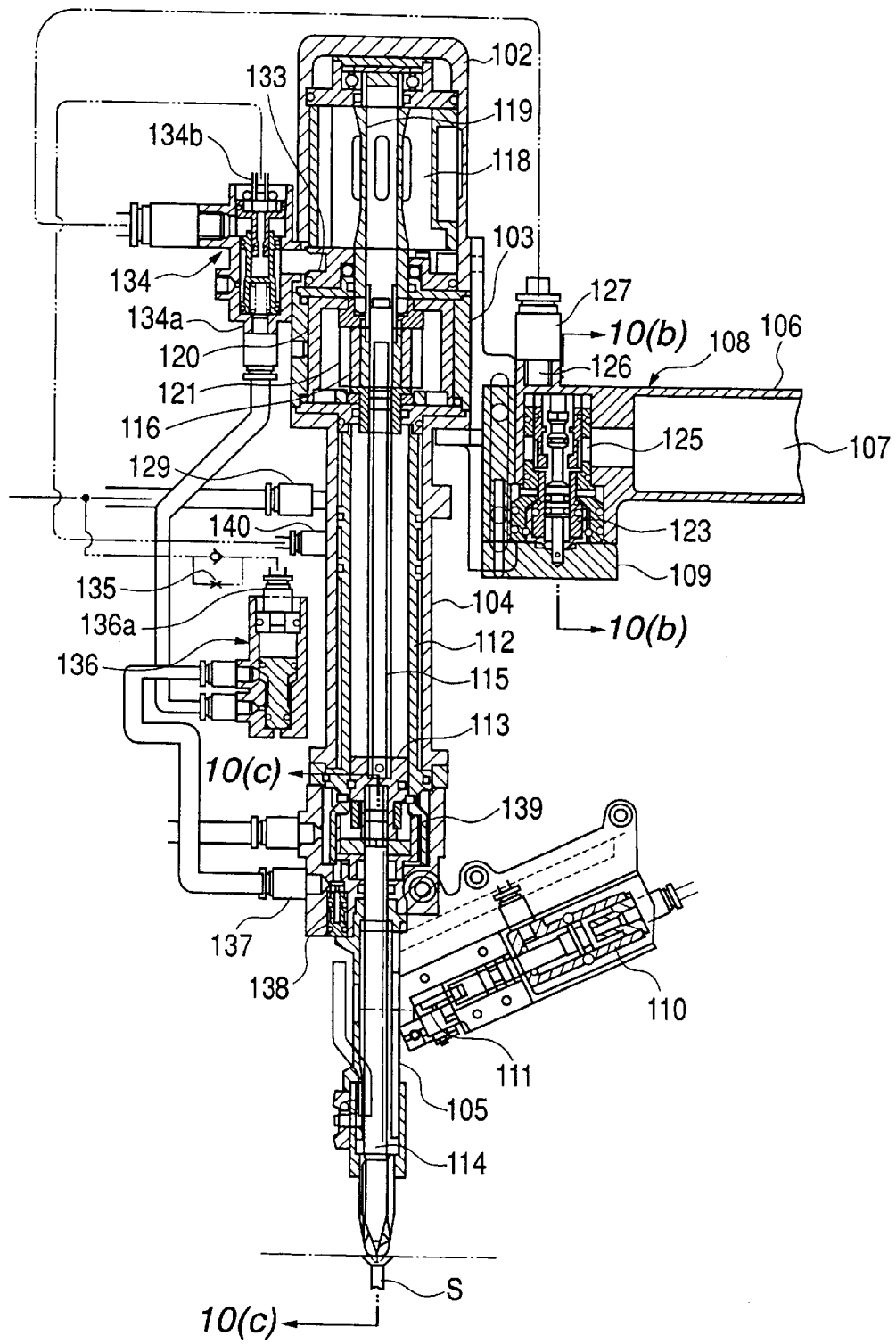
FIG. 10a is a sectional view when the air impact driver finishes to fasten a screw.
Figure 10B:
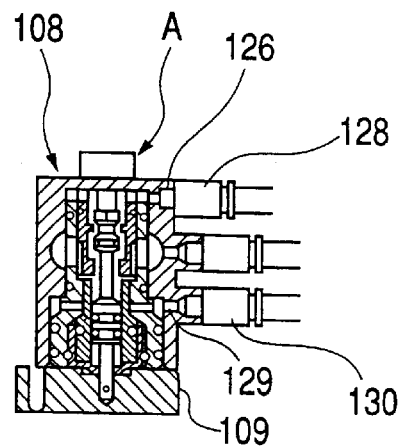
Figure 10C:
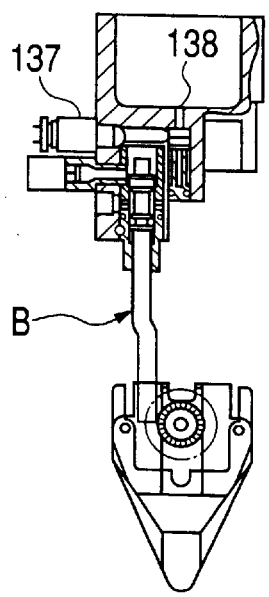

FIG. 10a shows a state in which the piston 113 reaches a lower end of a movable range, a poppet valve 138 at the bottom portion of the cylinder housing 104 is opened by being pressed by a movable bumper 139 in the double action air cylinder 112. Thereby, pneumatic pressure operated to the lower pilot port 134a of the changeover valve 134 via the pilot valve 136 is lowered, and the spool is lowered by pneumatic pressure supplied from an upper vent port 140 of the double action air cylinder 112 to an upper pilot port 134b of the changeover valve 134. Then, the changeover valve 134 is closed, and the rotor 118 is stopped.

When the trigger lever 109 is made OFF after finishing to fasten the screw, the stem 124 of the trigger valve 108 is lowered to an initial position, the pilot poppet 123 is lifted by supplying pressurized air from the air chamber 107 to the lower face of the pilot poppet 123. Then, pressurized air is supplied from the air chamber 107 to the retracting side air chamber of the double action air cylinder 112 via the lower port 129 of the trigger valve 108, and the piston 113 is lifted and returns to the standby position.

According to a conventional pneumatic nail striker, there is constructed a structure in which a blowback chamber communicating with the lower air chamber of the air cylinder is formed at a surrounding of the air cylinder, and the piston is returned to the standby position by pressure of compressed air filled in the blowback chamber in lowering the piston. When the conventional structure is adopted to the air impact driver, there may be caused a case in which pneumatic pressure of the blowback chamber becomes deficient. Then, the piston does not return to the standby position when the driver bit is solidly fitted to the recess of the screw. However, according to the air impact driver of the embodiment, the piston 113 is lifted by supplying high pressure air of the air chamber 107 to the retracting side air chamber of the double action air cylinder 112 and therefore, the piston 113 can firmly be returned to the standby position.

Further, the invention is not limited to the above-described embodiments but can variously be modified within the technical range of the invention and the invention naturally covers the modifications.

As has been explained above, the air impact driver of the invention is constituted such that the piston coupled with the driver bit is moved forwardly while being rotated to thereby fasten the screw. Therefore, different from the conventional air impact driver in which the spring type slide nose is pressed against a screw fastening object and the main body of the air impact driver is pushed to move in the direction of the screw fastening object, laboriousness of screw fastening operation is significantly alleviated and the operation is also simplified. Further, by mounting the fixed nose in place of the slide nose having a long slide stroke, the mechanism of the nose portion is simplified, a total length of the air impact driver is shortened and the air impact driver is light-weighted to thereby facilitate handling thereof.

Further, the spline shaft of the driver bit is fitted to the shaft hole of the driven rotational member which is intermittently rotated. Therefore, there are timings at which in rotating the driver bit, the driver bit is released from the driven rotational member, sliding resistance between the driven rotational member and the spline shaft is totally nullified and the driver bit is made free. Accordingly, the diameter of the piston for pushing down the driver bit can be reduced, thereby, the tool is downsized, further, the force of pushing the tool in operation is reduced and therefore, the operability is also improved.

Still further, the air impact driver of the invention is constituted such that the air motor, the centrifugal mesh clutch mechanism, the air cylinder and the fixed nose are arranged in one row. The centrifugal mesh clutch mechanism and the piston of the air cylinder are connected by spline fitting means, and the piston coupled with the drive bit advances while rotating to thereby fasten the screw. Therefore, the air impact driver of the invention can be made smaller than the conventional air impact driver provided with the nose having the long slide stroke at the front end portion of the main body of the air impact driver. Further, by forming the hole at the center of the rotor of the air motor and enabling the spline shape to advance into the center hole of the rotor in lifting the piston, the total length can be made as short as possible while sufficiently taking the slide stroke of the driver bit and handling and operability of the air impact driver is significantly promoted.

According to the air impact driver of the invention, the piston coupled with the driver bit advances while rotating to thereby fasten the screw. Therefore, different from the conventional air impact driver in which the slide nose of the spring type is pressed to a screw fastening object and the main body of the air impact driver is pushed to move in a direction of the screw fastening object, a total length of the air impact driver can be shortened to be easy to handle and laboriousness of screw fastening operation is alleviated.

Further, there is constructed the constitution in which the delaying circuit is inserted to the air motor control circuit and the rotation is started after the driver bit is lowered and is brought into contact with the screw. Therefore, there is not a concern of destructing the recess of the screw and stable operation can be expected.

As has been explained above, according to the air impact driver of the invention, the piston coupled with the driver bit advances while rotating to thereby fasten the screw. Therefore, different from the conventional air impact driver in which the spring type slide nose is pressed to a screw fastening object and the main body of the air impact driver is pushed to move in a direction of the screw fastening object, a total length of the air impact driver can be shortened, the air impact driver becomes easy to handle and laboriousness of screw fastening operation is alleviated.

Further, pressurized air in the air chamber is supplied to branch to the air cylinder and the air motor from the single trigger valve. Therefore, since the balance of driving energies of the air cylinder and the air motor is maintained constant, there is not a concern of the came-out of the driver bit and stable operation can be expected.

What is claimed is:

1. An air impact driver for driving to rotate a driver bit by transmitting a rotational torque of an air motor to the driver bit via a centrifugal mesh clutch mechanism,
   wherein the centrifugal mesh clutch mechanism, an air cylinder, and a fixed nose constituting a screw guide are arranged in one row on a same axis line, and the driver bit is mounted to a front face of a piston of the air cylinder, and a spline shaft is mounted to a rear face thereof, and a shaft hole slidingly paired with the spline shaft is provided at a center of a driven rotational member intermittently rotated by the centrifugal mesh clutch mechanism and fitted with the spline shaft, and
   wherein the spline shaft, the piston, and the driver bit advance while being rotated integrally by driving the air motor and the air cylinder to thereby fasten a screw.

2. An air impact driver according to claim 1, wherein the fixed nose is fixed on a front end portion of a main body of the air impact driver.

3. An air impact driver for driving to rotate a driver bit by transmitting a rotational torque of an air motor to the driver bit via a centrifugal mesh clutch mechanism, wherein an air motor, the centrifugal mesh clutch mechanism, an air cylinder, and a fixed nose constituting a screw guide are arranged in one row on a same axis line, and a driver bit is mounted to a front face of a piston of the air cylinder, and a spline shaft is mounted to a rear face thereof, and a shaft hole slidingly paired with the spline shaft is provided at a center of a driven rotational member of the centrifugal mesh clutch mechanism, and a hole having a diameter larger than a diameter of the spline shaft is provided at a center of a rotor of the air motor, and the spline shaft of the air cylinder penetrates a shaft hole of the driven rotating member and is formed to be capable of advancing into the center hole of the rotor, and wherein the piston and the driver bit advance while rotating integrally to thereby fasten a screw by driving the air motor and the air cylinder.

4. An air impact driver according to claim 3, wherein the fixed nose is fixed on a front end portion of a main body of the air impact driver.

5. An air impact driver for driving to rotate a driver bit by transmitting a rotational torque of an air motor to the driver bit via a centrifugal mesh clutch mechanism, wherein the centrifugal mesh clutch mechanism, an air cylinder, and a fixed nose constituting a screw guide are arranged in one row on a same axis line, and a driver bit is mounted to a front face of a piston of the air cylinder, and a spline shaft is mounted to a rear face thereof, and a shaft hole slidingly paired with the spline shaft is provided at a center of a driven rotational member of the centrifugal mesh clutch mechanism and fitted with the spline shaft, and wherein the spline shaft, the piston, and the driver bit advance while integrally rotating to thereby fasten a screw by driving the air motor and the air cylinder, and wherein a delaying circuit is inserted to an air motor control circuit to thereby delay a start timing of the air motor relative to a start timing of the air cylinder, and rotation is started after the driver bit is lowered and brought into contact with the screw head.

6. An air impact driver according to claim 5, wherein the fixed nose is fixed on a front end portion of a main body of the air impact driver.

7. An air impact driver comprising:

an air motor;

a centrifugal mesh clutch mechanism;

a double action air cylinder; and a pneumatic circuit for supplying pressurized air to a retracting side air chamber of the double action air cylinder via a trigger valve at an off position of the trigger valve and for supplying pressurized air to the air motor and an extracting side air chamber of the double action air cylinder via the trigger valve at an on position of the trigger valve, wherein a driver bit is mounted to a front face of a piston of the double action cylinder, and the spline shaft is mounted to a rear face of the double action cylinder, and the spline shaft and a driven rotational member of the centrifugal mesh clutch mechanism are fitted to each other by a spline, and wherein the piston, the spline shaft and the driver bit advance while rotating integrally by making the trigger valve on, and the piston, the spline shaft and the driver bit are retracted and returned to initial positions by making the trigger valve off.

* * * * *